United States Patent [19]
Decuir

[11] 3,961,571
[45] June 8, 1976

[54] OVEN FOR COOKING FOOD BY A HOT SMOKE PROCESS

[76] Inventor: Arthur Decuir, 825 Morrison Ave., Bronx, N.Y. 10472

[22] Filed: Feb. 11, 1972

[21] Appl. No.: 225,567

[52] U.S. Cl. ................................... 99/474; 99/480
[51] Int. Cl. .............................................. A23b 1/04
[58] Field of Search ............. 99/259, 260, 261–331, 99/341, 421–443, 446, 467, 468, 469, 470, 471, 472, 473, 474, 475, 476, 477–480; 126/25 B, 36; 110/1 F

[56] References Cited
UNITED STATES PATENTS

| | | | |
|---|---|---|---|
| 934,512 | 9/1909 | Esposito | 110/1 F X |
| 2,558,569 | 6/1951 | Koch | 99/443 R |
| 2,600,760 | 6/1952 | Guffey | 99/341 |
| 2,746,377 | 5/1956 | Parks | 99/446 X |
| 3,049,071 | 8/1962 | Diack | 99/446 X |
| 3,324,788 | 6/1967 | LaFrance | 99/446 X |
| 3,361,055 | 1/1968 | Hondroulis | 99/341 X |
| 3,524,403 | 8/1970 | Treloar | 99/446 X |
| 3,583,307 | 6/1971 | Lee | 99/446 X |

*Primary Examiner*—Harvey C. Hornsby
*Assistant Examiner*—Arthur O. Henderson

[57] ABSTRACT

An oven for cooking food by a hot smoke process including a base of fire brick or insulated metal and having a hood equipped with transparent glass panes for observing the cooking process. A grate near an open end on the base receives wood, which when burned, imparts flavor to the food being cooked. Supplementary heat in the form of a gas burner initially ignites the wood and reignites any part thereof which becomes extinguished. The temperature of the oven automatically is controlled by regulating the operation of the gas burner and by controlling the position of a damper in a hot smoke exhaust duct.

1 Claim, 5 Drawing Figures

OVEN FOR COOKING FOOD BY A HOT SMOKE PROCESS

BACKGROUND OF THE INVENTION

The invention described herein relates to cooking food products and more particularly to an oven used for cooking large quantities of food for restaurant or other commercial purposes.

The prior art discloses many different types of equipment for cooking or curing foods by dry or moist heat processes. In the usual design, meat for example, is placed on trays in closed containers and cooked under controlled temperature conditions for established time periods. The circulating air is hot and controlled at a constant temperature to achieve proper cooking of the food but no flavor is imparted to it other than that provided by different kinds of plant seasonings which are applied directly to the food.

Other types of closed ovens are known where the food is cooked or cured by hot or cold smoke processes. In these designs, hot smoke is generated by a burning wood log and is caused to flow over the food, thus imparting flavor to it. However, no means are employed for conveniently inspecting the food during the cooking process because provision is not made for releasing the trapped smoke prior to inspection. Also, the temperature cannot be controlled within reasonable limits because of the burning characteristics of the wood. As a result, the food often is cooked too little or too much.

BRIEF SUMMARY OF THE INVENTION

Briefly stated, the present invention eliminates the above disadvantage in the prior art by providing an oven which utilizes wood as a primary heat source preferably supplemented by electrical heat or a combustible gas when necessary to provide the desired degree of heat to the oven. The heat generated by the burning wood is circulated through the oven by smoke and air with the heat and smoke respectively serving to cook the food and impart flavor to it. Temperature sensing and control devices associated with the oven, control the level of heat and therefore the cooking process. A blower is used for exhausting smoke from the oven prior to inspecting or handling the food being cooked. Single or multiple transparent hoods form the upper section of the oven and trays are used for collecting the residue from food being cooked and the wood used for furnishing oven heat.

An object of the invention therefore is to provide an oven which utilizes solid fuel as a primary heat source, supplemented by additional heat, for cooking food by a hot smoke process.

Another object of the invention is the provision of an oven which includes a cooking area and single or multiple removable hoods for permitting inspection of the food during a cooking process.

Still another object of the invention is to provide an oven having temperature control means for regulating the oven temperature and exhausting generated smoke during a cooking process.

BRIEF DESCRIPTION OF THE DRAWING

While the specification concludes with claims particularly point out and distinctly claiming the subject matter of the invention, it is believed the invention will be better understood from the following description taken in conjunction with the accompanying drawing, wherein:

Figure 1:
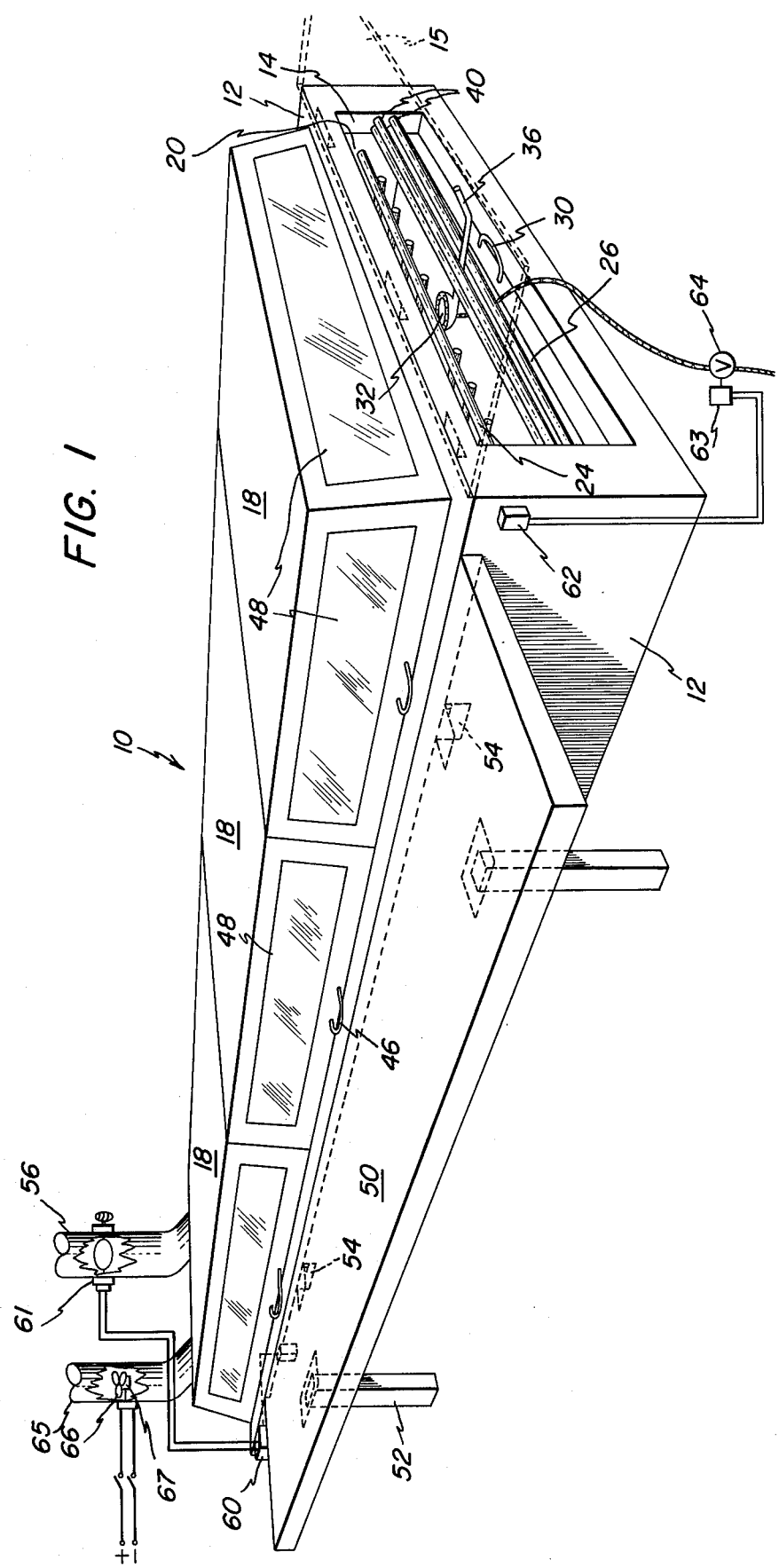
FIG. 1 is a perspective view of an oven embodying the invention.

Referring now to the drawings wherein like reference characters designate like or corresponding parts throughout the several views, there is shown an oven 10 comprising a base having walls 12 including an opening 14 on one end for the reception of fuel. Opening 14 is closed by a hinged door 15. A mesh type grill is positioned in the open top 16 and multiple hoods 18 are removably mounted on the upper surface of the base walls.

The base preferably includes a lining of fire brick 20 to withstand heat generated in the oven and a face covering of brick 22 desirably is placed over the fire brick lining.

The oven is designed primarily to cook food, particularly meat or seafood, by a hot smoke process wherein gases and carbon particles resulting from the combustion of wood, carry the heat thus generated to the food being cooked. The smoke and its contained heat is circulated by natural convection currents across the food and as some heat is given up, the smoke naturally falls to a lower area in the oven and then continues its flow to the burning wood to be reheated and recirculated throughout the oven.

Figure 2:
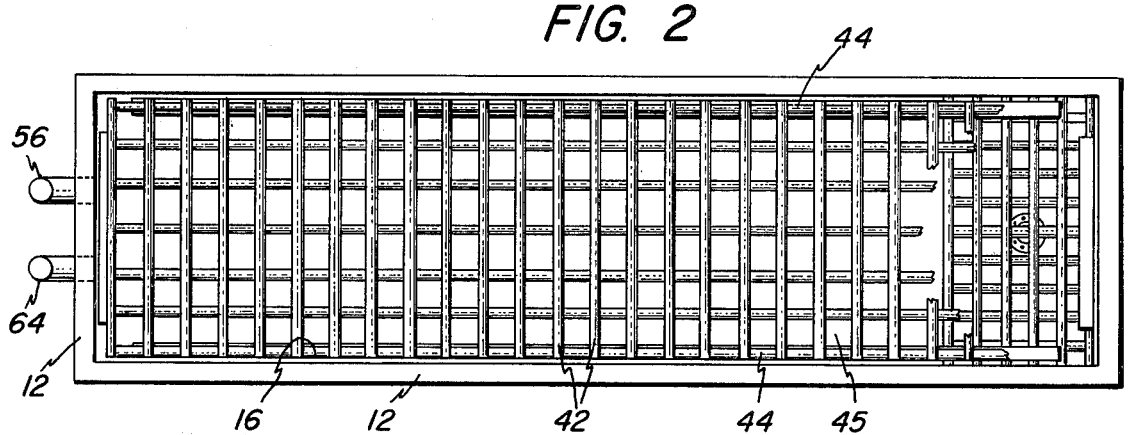
FIG. 2 is a plan view of the oven with the hoods removed.
Figure 3:
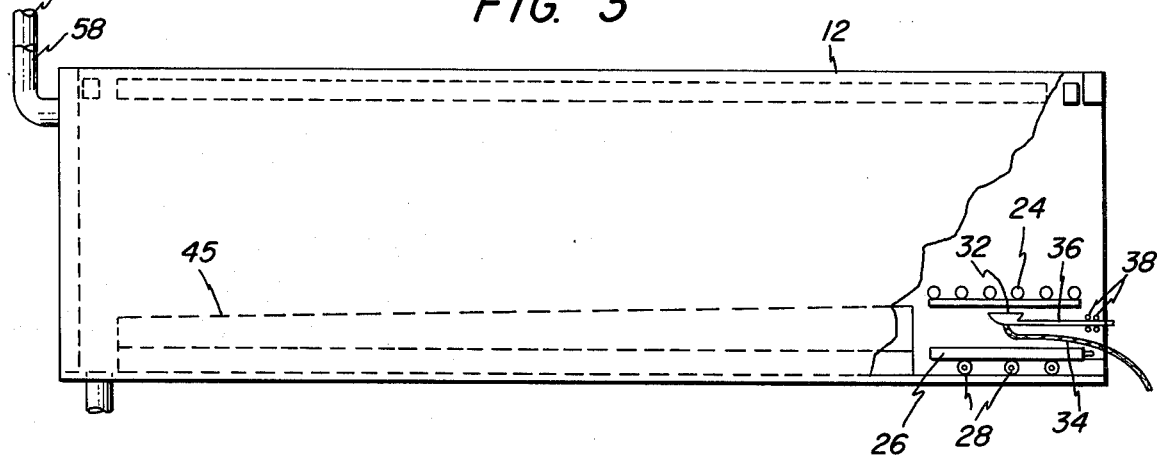
FIG. 3 is a view in elevation, partly in section, showing details of the heat generating devices.
Figure 4:
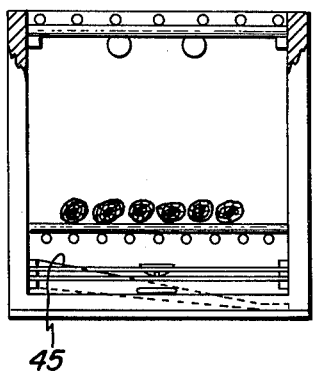
FIG. 4 is an end view of FIG. 3.

The wood used for providing heat is placed on a grate 24 of criss-crossed and interconnected bars having their opposite ends either embedded in opposite side walls in the base or supported on angle iron brackets attached to the side walls. Charcoal or other solid fuel may obviously be used for furnishing heat to the oven cooking spaces. As illustrated in FIGS. 2 and 3, the grate 24 extends only a small distance from open end 14 toward the other end of the oven.

During combustion of the wood, ashes and other residue falls through the grate on to a removable tray 26 supported on stationary blocks or rollers 28 attached to the oven floor or to the oven side walls. A handle 30 welded to tray 26 conveniently may be used for withdrawing the tray from the oven for removal of collected residue.

Different kinds of wood may be used and each will have varying degrees of moisture content so that combustion will occur at non-uniform rates. To help assure uniformity in the combustion process, a supplementary heat source in the form of a gas burner 32 is provided to initially ignite the wood and to reignite any portion of it which may become extinguished. The burner head is located beneath the wood and is connected to a source of gas supply through flexible tubing 34. To permit movement of the burner 32 beneath and along the length of grate 24, an arm 36 attached to the burner body is arranged to ride between a pair of spaced parelled bars 38 fixed in brackets 40 mounted on the oven inner walls. As the flame on any portion of a wood log dies down, the burner may be moved along the length of supporting bars 38 to the desired place and that portion of the log ignited to provide reasonable uniformity in the combustion process. It will be understood that wood serves as the primary heat source and the function of burner 32 is to serve as ignition means for the wood. It could serve other functions, such as prewarming the oven.

As illustrated in FIG. 2, grill 42 consisting of a mesh of interlocked, spaced bars of stainless steel receives meat or other food to be cooked in the oven. The grill is loosely placed on a pair of brackets 44 secured respectively to the oven side walls to allow removal for both grill and oven cleaning purposes. As the food is cooked, grease or other residue from the food drips on to a planted grease tray 45 which then drains away from the heat source and into a grease collecting channel for subsequent removal from the oven.

Since it is necessary to retain heat in the oven and still inspect the food during the cooking process, separate hoods 18 are hinged to the back of the oven and arranged to be opened upwardly by handles 46. Each hood preferably is made of light gage stainless steel, plastic or aluminum having heat treated glass panels 48 which allow visual inspection of the food and burning wood. A drop leaf table 50 supported by legs 52 and hinged at 54 to the front of the oven serves as a counter to facilitate handling of the food.

A smoke outlet duct 56 extends through the back wall of the oven for venting hot smoke to the atmosphere or to a separate room where it can be used for curing meat according to well known cold smoke processes. The outlet is controlled by damper 58 which may be activated manually, or by remote control, to any one of a number of settings between the open and closed position. Preferably, a conventional thermostat 60 may be used to control the position of the damper. Its sensing element (not shown) is located inside the oven to detect oven temperature. When the thermostat is set to a temperature dictated by the particular food to be cooked, it will act to attempt to hold the oven temperature at the selected level. The thermostat is connected to a voltage source and its output to a small linear or stepping motor 61 arranged to control the position of damper 58 in accordance with temperature flucuations in the oven. As the temperature falls, the damper automatically is moved toward the closed position to retain heat within the oven. Likewise, as the temperature rises, damper operation is reversed.

A second thermostat 62 having its sensory element in the oven may be used to control the burner. As indicated above, different woods burn at different rates, depending on moisture content, and thus furnish varying amounts of heat energy to the oven. To help assure that a wood log will burn at a uniform rate, the burner is placed under control of thermostat 62 which turns the burner on and off as oven temperature rises or falls. This is accomplished by connecting the thermostat output to a solenoid 63 which controls a valve 64 in the gas supply line to the burner. The thermostat is set to energize the solenoid to a valve open position when the oven temperature falls to a low level, about 250°F. As the burner gas flame assists burning of the wood and the temperature rises to say 275°F, the thermostat sensing element detects the rise and activates the solenoid to a valve closed position. By utilizing this kind of control arrangement, the oven is not only maintained at the desired cooking temperature but flavor also is imparted to the food being cooked.

During the course of cooking, it often is necessary to open hoods 18 to inspect and handle the food. To eliminate the outpouring of smoke from an oven into a room when a hood is opened, an additional smoke outlet duct 65 extends through the oven wall and terminates at its other end outside the building. A blower connected to motor 67 mounted in the duct, is operated to clear the cooking spaces of smoke prior to raising any one or all of hoods 18.

Figure 5:
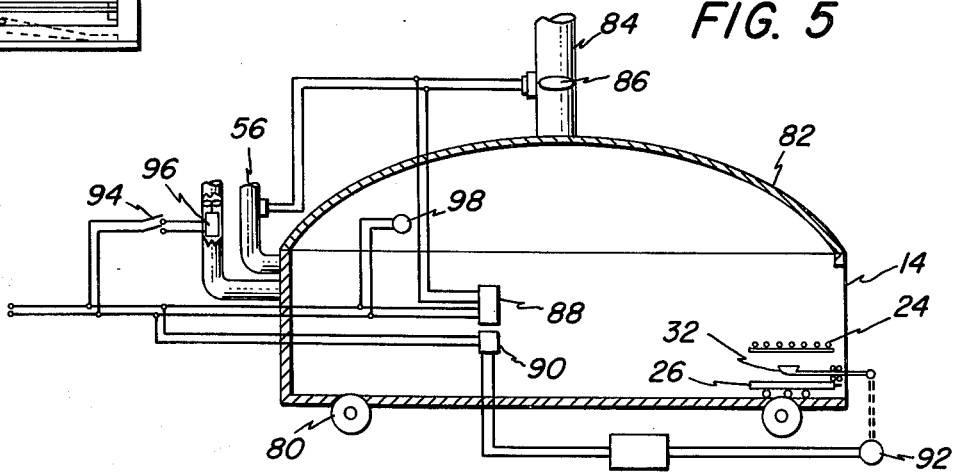
FIG. 5 is a modification of the invention.

FIG. 5 illustrates a portable type of oven suitable for transfer to different sites to carry out cooking functions. The oven base is made of sheet steel and includes a lining of insulation to prevent the escape of heat, rather than being lined of fire brick. An opening 14 on one end is essentially of the same configuration as that shown in FIG. 1, as are the other components used for generating heat. The grate 24, ash tray 26, burner 32 and the means for moving the burner beneath and longitudinally of the grate are of the same design. Wheels 80 provide portability to the oven. Although multiple hoods may be used, a single hood 82 of dome, square or other configuration is more appropriate for small oven sizes.

In addition to smoke exhaust duct 56 and damper 58, a similar duct 84 is mounted directly on hood 82. The duct damper 86 is controlled by thermostat 88 which senses oven temperature. As the oven temperature reaches the thermostat setting for the particular food being cooked, the thermostat causes damper 86 to open and vent hot smoke to a cold smoke room or the atmosphere. As the temperature then commences to drop, the damper gradually is closed to maintain the oven as the predetermined temperature setting. As in FIG. 1, an additional thermostat 90 controls valve 92 in the gas supply line to burner 32.

Since the dampers in ducts 56 and 84 may be closed at a time when opening of the hood may be desirable, a switch 94 in circuit with a blower motor 96 is used for positively exhausting hot smoke through the duct at a high rate. A light source 98 is used to illuminate the interior of the oven.

In view of the above, it will be apparent to those skilled in the art that many modifications and variations may be made in light of the above teachings. For example, an electrical heating unit may be substituted for the gas burner to provide the supplemental heat. Circulation of heat therefrom may be accomplished by supplying a small fan which blows air over the heating unit and into the oven. It therefore is to be understood that within the scope of the appended claims, the invention may be practised other than as specifically described.

What I claim as new and desire to secure by U.S. Letters Patent is:

1. An oven for cooking food by a hot smoke process comprising:
   a base having an open top and side walls including an opening in one end for receiving fuel for combustion purposes;
   a grate in said base adjacent the opening on which solid fuel is placed for furnishing heat to the oven;
   a removable pan beneath said grate for receiving the residue resulting from combustion of the fuel;
   supplementary heat means including a gas burner mounted near the grate for initially igniting the solid fuel and reigniting portions thereof in the event it becomes extinguished, said burner comprising an arm mounted between a pair of parallel bars in said base, said arm and attached burner being movable beneath and along the width of said grate;
   hood means covering the top opening in said base and thereby providing an enclosure for the oven;

a grill supported by the base side walls and located in said top opening, the arrangement being such that when food is placed on the grill, the space bound by the hood and base walls establishes a closed circuit for the circulation of heat over the food and in a closed path in the oven;

a grease pan mounted beneath said grill;

a smoke exhaust pipe having a damper therein connected to a thermostat in the oven for controlling the temperature level in the oven; and a second smoke exhaust pipe connected with said oven, a blower in said pipe, and switch means for energizing said blower when it is desired to vent hot gases from the oven to the atmosphere prior to opening said hood means.

* * * * *